(No Model.)

R. EICKEMEYER.
VOLT OR AMPÈRE METER.

No. 434,557. Patented Aug. 19, 1890.

Attest:
Philip F. Larner.
Nowell Bartle.

Inventor:
Rudolf Eickemeyer.
By _____
Attorney.

THE NORRIS PETERS CO., PHOTO-LITHO., WASHINGTON, D. C.

UNITED STATES PATENT OFFICE.

RUDOLF EICKEMEYER, OF YONKERS, NEW YORK.

VOLT OR AMPÈRE METER.

SPECIFICATION forming part of Letters Patent No. 434,557, dated August 19, 1890.

Application filed December 17, 1889. Serial No. 334,015. (No model.)

*To all whom it may concern:*

Be it known that I, RUDOLF EICKEMEYER, of Yonkers, in the county of Westchester and State of New York, have invented certain new and useful Improvements in Volt or Ampère Meters; and I do hereby declare that the following specification, taken in connection with the drawings furnished and forming a part of the same, is a clear, true, and complete description of my invention.

In meters as heretofore constructed for measuring volts and ampères the indicating-needle responds very slowly to variations in the electric currents, and sometimes a meter will present lower readings on the scale when a current is gradually increased than when the current is gradually reduced, all of which I ascribe to the fact that heretofore the indicators carry masses of iron of considerable bulk, and in which more or less permanent magnetism is developed.

One object of my invention is to remedy said defects, and this I accomplish by providing the measuring-indicator with very small and separated masses of iron, which when magnetically influenced are amply capable of promptly moving the indicator, and in which the liability of permanent magnetism to any objectionable extent is reduced to a minimum.

Another object of my invention is to enable adjustments by which the movement of the indicator may be modified, so as to have the divisions on the scale as large as possible within such limits or range as may be specially desirable, and this I accomplish by mounting the several small masses of iron on the indicator so that they may be variably adjusted with relation to the pointer of the indicator. This novel distribution of the iron also enables the economical construction of meters specially intended for measurement in high ranges, or for low or for medium ranges, because in all meters the several corresponding parts will be precisely alike and the meters need differ only in the location of one or more of said small pieces of iron upon the indicator which carries them.

To more particularly describe my invention, I will refer to the accompanying drawings, in which—

Figure 1:
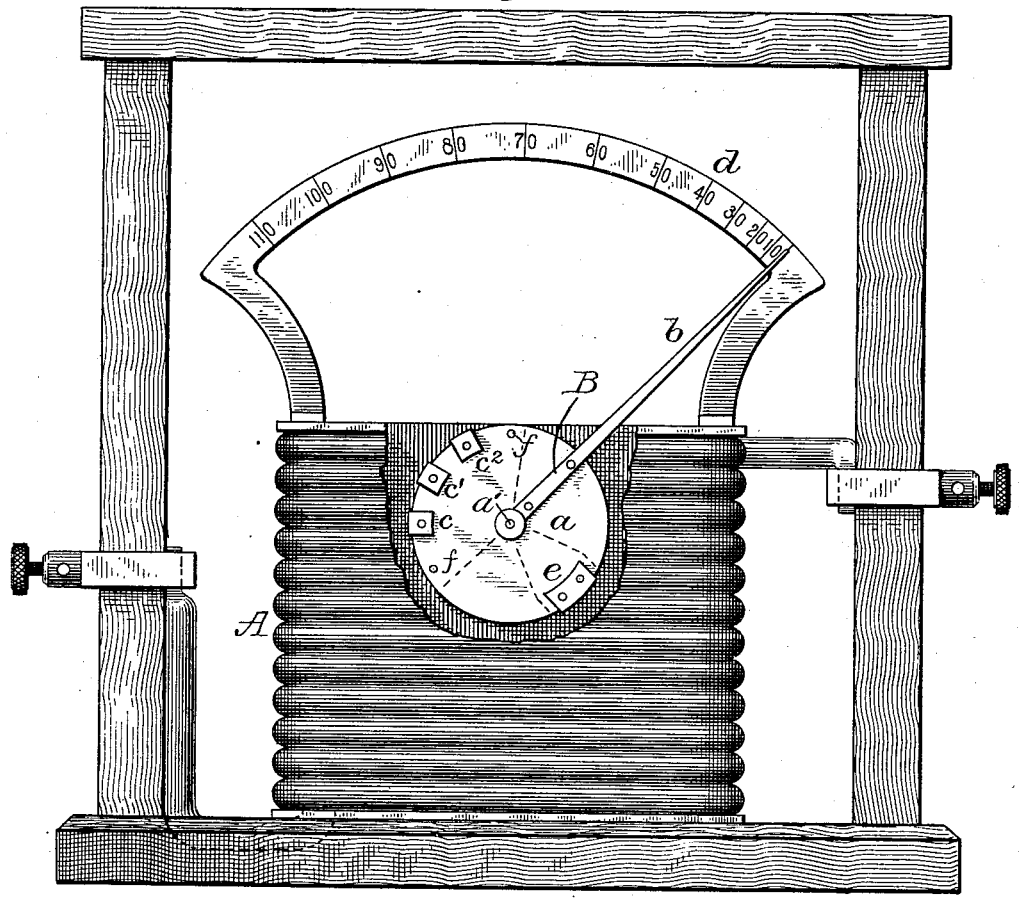
Figure 2:

Figure 1 illustrates in side view one of my meters with a portion of the exciting-coil broken away for fully disclosing the indicator. Fig. 2 is a top view of the indicator and its axial pivot detached from the meter.

The exciting-coil A is as heretofore, and is mounted in a suitable frame and provided with proper binding-posts at its terminals.

The indicator B includes an axially-mounted disk $a$, its pointer $b$, and pieces of iron $c$ $c'$ $c^2$.

The disk $a$ is composed of non-magnetic material—such as copper, brass, mica, or hard rubber—and its axis or pivot $a'$ is so located as to place the lower edge of the disk near the middle of the coil. The disk is provided with a radiating needle or pointer $b$, preferably composed of aluminum, and at its outer end it overlies a scale-plate $d$, and is maintained at its normal position by a suitable weight $e$, which is non-magnetic and is applied to the edge of the disk $a$. If desired, the pointer may be directly mounted on the pivot and provided, as indicated in dotted lines, with a segmental arm for receiving the pieces of iron and an opposite arm for carrying the weight, the disk here shown serving as a well-balanced support for the iron, the pointer, and the weight.

The iron carried by the indicator is in small separated masses, which may be varied in number. As here shown, there are three of these masses $c$, $c'$, and $c^2$. They are each preferably bent or slotted, so as to be evenly mounted and readily slipped upon the edge of the disk from one position to another and secured in position by pins, the disk having a set or series of small holes $f$, and each piece of iron having a hole for the reception of a screw or pin. These pieces of iron, being very small and disconnected from each other, are promptly saturated by electro-magnetism even when the magnetic currents are very light, and therefore should any permanent magnetism be developed in the iron it cannot impair the efficiency of the instrument. The diminutive bulk of each piece of iron causes a prompt release or discharge of magnetism, and the needle is moved with substantial uniformity whether the electric current in the coil is gradually decreased or increased, whereas with prior meters, in which the iron is in one comparatively large mass, the needle will indicate a lower reading on the scale while the current is being gradually increased than it will during a gradual decrease.

As shown in Fig. 1, the indicator is at its normal or zero position. When the coil is excited, the pieces of iron are pulled downward in proportion to the strength of the exciting-current, and if said current be properly within the extreme limit or range of the instrument the pieces of iron will be pulled downward and move the needle in proportion to the strength of the current, the instrument measuring from ten to one hundred and ten ampères. It will be seen when the needle is in its normal position that the lowest piece of iron $c$ is located in the horizontal plane occupied by the axis of the disk, and that the other pieces of iron $c'$ and $c^2$ are located above. When thus adjusted, it is obvious that weak currents can only slightly move the needle, and that for measuring below, say, ten ampères, a graduation on the scale between zero and ten would be too fine for practical service, and therefore if the instrument is desired for such low measurements the upper piece of iron $c^2$ will be transferred to the lowest position, so that one of said pieces will be on a line with the axis of the pointer and the other will be below that line, and then both pieces being simultaneously acted upon the needle will be moved to a greater extent than before by currents of the same strength, and this would cause the ampère-spaces to be largest at the lower end of the scale and the spacing would gradually lessen above.

If measurements higher than, say, one hundred and ten ampères are desired, the lowest piece of iron $c$ will be transferred on the disk to the upper hole $f$, so that the piece of iron $c'$ would then be the lowest, and when so adjusted the movement of the needle would be slow until the lowest piece of iron had reached and passed beyond the horizontal line of the axis of the disk, and from that time onward the needle would show the largest variations in position with the least variations in the exciting-current.

The scale-plate $d$ is here shown with but one set of graduations adapted to the adjustment of the pieces of iron as shown; but under either of the variations mentioned this scale can be read by the aid of a chart affording proper transpositions of the scale into appropriate readings for either adjustment, or the scale-plate may be provided with three separate sets of graduations, or when no provision has been made for adjusting the iron on the indicator each meter will have a scale appropriately graduated according to whether the range of measurements is high, low, or medium.

The exciting-coil used in ampère measurements is composed, as heretofore, of coarse wire; but when designed for use as a voltmeter the usual fine wire is employed.

Having thus described my invention, I claim as new and desire to secure by Letters Patent—

1. In a meter for measuring volts or ampères, the combination, with an exciting-coil, of a pivoted indicator composed mainly of non-magnetic material weighted for maintaining it in its normal position and provided with small pieces of iron, substantially as described, whereby when an electric current is delivered to the coil prompt magnetic saturation is secured in one or more of said pieces of iron and the liability of objectionable permanent magnetism reduced to a minimum.

2. In a meter for measuring volts or ampères, the combination, with an exciting-coil, of a pivoted indicator mainly composed of non-magnetic material and carrying small separate pieces of iron which are adjustable in their positions, substantially as described, whereby the meter may be adjusted with special reference to making high, low, or medium measurements.

RUDOLF EICKEMEYER.

Witnesses:
R. EICKEMEYER, Jr.,
E. P. MOFFAT.